United States Patent [19]

Marchini

[11] 3,764,760

[45] Oct. 9, 1973

[54] METHOD OF AND MEANS FOR EMITTING INTERROGATION CODES TO SUPERVISE REPEATERS OF PCM TELECOMMUNICATION SYSTEM

[75] Inventor: Dino Marchini, Trezzano sul Naviglio, Italy

[73] Assignee: Societa Italiana Telecomunicazioni Siemens S.p.A., Milan, Italy

[22] Filed: Dec. 27, 1971

[21] Appl. No.: 212,283

[30] Foreign Application Priority Data

Dec. 24, 1970 Italy .............................. 33529 A/70

[52] U.S. Cl. .......................... 179/175.31 R, 328/14

[51] Int. Cl. ............................................ H04b 3/46

[58] Field of Search .......................... 179/175.31 R; 328/104, 162, 164, 14; 340/146.1 E, 352, 355

[56] References Cited

UNITED STATES PATENTS 3,649,777 3/1972 Matsushima .............. 179/175.31 R 3,083,270 3/1963 Mayo ......................... 179/175.31 R 3,062,927 11/1962 Hamori ...................... 179/175.31 R

*Primary Examiner*—Kathleen H. Claffy
*Assistant Examiner*—Douglas W. Olms
*Attorney*—Karl F. Ross

[57] ABSTRACT

To test the performance of several repeaters cascaded along a PCM telecommunication channel, a pulse generator at a terminal station is settable to emit bipolar pulse trains in which a balanced pulse pattern, recurring $m$ times in succession, alternates with an unbalanced modification of that pulse pattern, recurring $n$ times in succession; the total number of cycles $(n+m)$ per repetitive pulse sequence is variable to address different repeaters with output filters tuned to the respective repetition frequencies. By altering the degree of unbalance in the second ($m$-cycle) portion of the pulse sequence, the fidelity of the regenerating operation of the interrogated repeater can be ascertained from the presence or absence of correlation between the number of odd pulses per cycle and the amplitude of the low-frequency wave passed by the output filter.

14 Claims, 9 Drawing Figures

METHOD OF AND MEANS FOR EMITTING INTERROGATION CODES TO SUPERVISE REPEATERS OF PCM TELECOMMUNICATION SYSTEM

My present invention relates to the generation of interrogation codes to be used for the remote supervision of repeaters in a signal path of a telecommunication system using pulse-code modulation.

Such interrogation codes generally consist of a sequence of pulses which may be transmitted to the repeater over the main signal path or a special service line and which recurs in a predetermined rhythm, different for the several cascaded repeaters of the channel, to give rise to a low-frequency response signal clearing a band-pass filter in the output of the repeater for which it is intended. This response signal, which may be returned to a control unit at a terminal station by way of the service line or the main transmission path, has a relatively high amplitude if the interrogated repeater operates correctly, i.e. if the incoming pulses or bits are accurately regenerated. If the repeater is defective, a certain amount of noise is superimposed upon the regenerated interrogation code and tends to lower the amplitude of the response signal.

An important object of the present invention is to provide a relatively simple network for producing an interrogation code of this description that can be readily altered to test the degree of malfunction of any bipolar repeater to which it is addressed, as well as to monitor the performance of different repeaters connected across a given PCM channel.

A related object is to provide a method of selectively addressing any one of several cascaded repeaters in a variety of ways to determine their degree of efficiency.

A supervisory network according to my invention comprises, essentially, a timer emitting a continuous train of clock pulses recurring at intervals $t$, this timer controlling a pulse generator which iteratively produces a basic pulse pattern in the rhythm of the clock pulses extending over a cycle $T = pt$ ($p$ being an integer). The timer also controls a source of unbalancing pulses which alternates between operation and nonoperation during $m$ and $n$ consecutive cycles T, respectively, and which feeds a synthesizer also receiving the basic pulse pattern in order to combine the latter and the unbalancing pulses into a recurrent code sequence consisting of $n$ cycles of a balanced pulse pattern (of duration T) followed by $m$ cycles of the same pulse pattern modified by the unbalancing pulses. By "balanced pulse pattern" I mean a succession of an even number of pulses of alternating polarity yeilding, upon integration in the repeater output, a d-c component zero; the modified pulse pattern, by virtue of its unbalanced character, yields a finite d-c component so that the alternation of these two components in the rhythm of the selected filter frequency generates a response signal in the output of the assigned repeater.

By varying the cadence of the unbalancing pulses, with the aid of a selector coupled to the source thereof, I am able to alter the degree of unbalance of the modified pulse pattern generated during the $m$ consecutive cycles T of the code sequence; if the amplitude of the response signal changes in the expected manner with the density of the deviations from the original balanced pattern, the repeater can be assumed to operate properly.

The two integers $m$ and $n$ may be identical or different but in any event should be so close to each other as to provide a duty cycle of about 50 percent in the repeater output. Thus, with the period of the low-frequency response signal equal to $(m+n)$ times the basic period $T = pt$, $m$ and $n$ need not differ by more than 1 if their sum is odd and are preferably equal if their sum is even.

The selection of the desired values for $m$ and $n$ may be carried out in a part of the timer which operates as a square-wave generator working into the synthesizer for intermittently inhibiting the unbalancing pulses which otherwise reach an inverter stage in that synthesizer designed to change the polarity of alternate unipolar pulses emitted, as part of the aforementioned basic pattern, by logical circuitry such as an AND gate having inputs connected to a combination of stage outputs of a binary counter stepped by the clock pulses. The inverter stage advantageously includes a pair of coincidence (e.g. AND) gates inserted in two parallel paths for the paired unipolar pulses, these gates being alternately unblocked by a flip-flop switched by the same pulses. As these paired pulses alternately pass in opposite directions through a coupling stage (e.g. a transformer primary) connected across the two paths beyond the coincidence gates, they appear with alternate polarity on a transmission channel fed from that coupling stage. The unbalancing pulses, applied to an additional gate or set of gates in tandem with these coincidence gates, modify the travel of the paired pulses along these paths by either blocking one of the paths or effectively switching them; in the first instance the outgoing pulses of one polarity are selectively suppressed by the unbalancing pulses, whereas in the second instance their polarity is reversed.

The choice of the pulses to be suppressed or reversed is made with the aid of the aforementioned selector which can be set to derive the unbalancing pulses from any one of several coincidence gates that are energized in different combinations by the several stage outputs of the clock-pulse counter. As more fully described hereinafter, two of these coincidence gates may be so connected that their respective unbalancing pulses blot out either the positive or the negative pulses of the unbalanced portion of the interrogation code. Thus, a switch between these two pulse trains facilitates the ascertainment of defective regeneration of either positive or negative pulses by the repeater.

The above and other features of my invention will be described in detail hereinafter with reference to the accompanying drawing in which.

Figure 1:
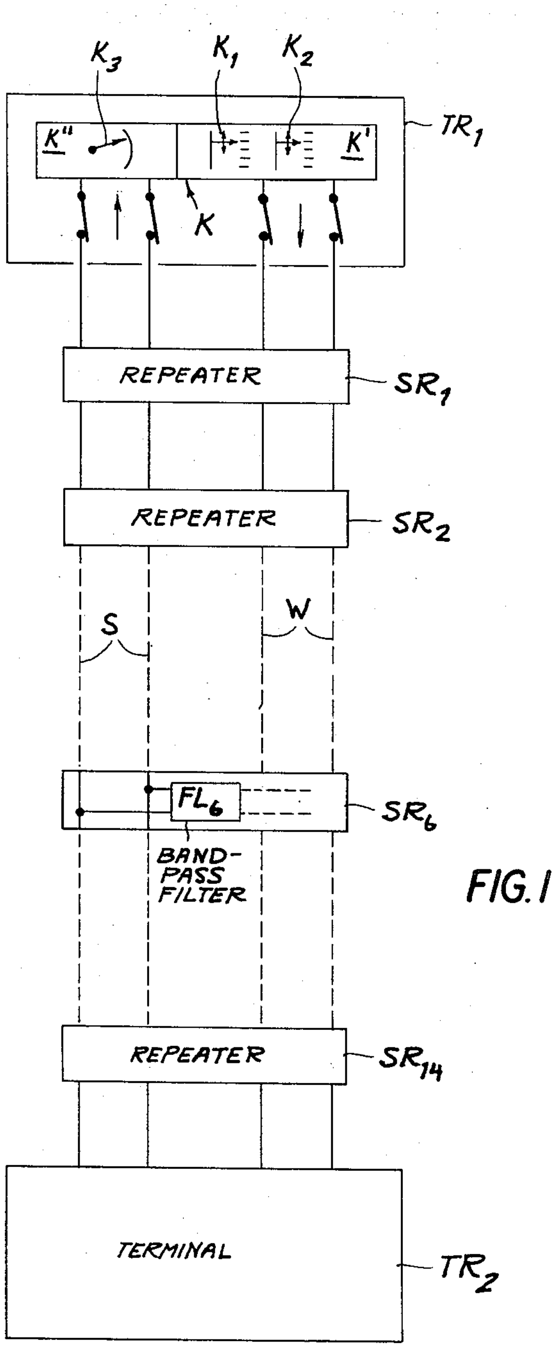
FIG. 1 is a schematic illustration of a PCM telecommunication system with several bipolar repeaters in a transmission channel between two terminal stations.

In FIG. 1 I have shown a PCM telecommunication system including a pair of terminal stations $TR_1$ and $TR_2$ interconnected by a transmission channel including a main signal path W, shown as a two-wire line, and a similar service line S. A number of PCM repeaters (14 in this specific instance) are inserted in this channel and have been designated $SR_1$, $SR_2$, . . . $SR_6$, . . . $Sr_{14}$.

Terminal $TR_1$ includes, besides the usual transceiving equipment not further illustrated, a monitoring unit K subdivided into a transmitting section K' and a receiving section K''. Section K', described in greater detail hereinafter with reference to subsequent Figures, comprises two manual selectors $K_1$ and $K_2$ for (1) addressing any one of the associated repeaters $SR_1 - SR_{14}$ and (2) choosing one of several modes of interrogation for the addressed repeater to determine its degree of efficiency. Section K'' comprises an instrument $K_3$, such as an a-c voltmeter, indicating the amplitude of a low-frequency response signal recieved back from the interrogated repeater. The interrogation code generated by section K' is transmitted to all the cascaded repeaters by way of the main line W; the response signal is sent back by the addressed repeater via the service line S. As particularly illustrated for the repeater $SR_6$, a band-pass filter $FL_6$ in the repeater output discriminates against signal frequencies other than the one inherent in the interrogation code specifically addressed to that repeater.

Figure 2:
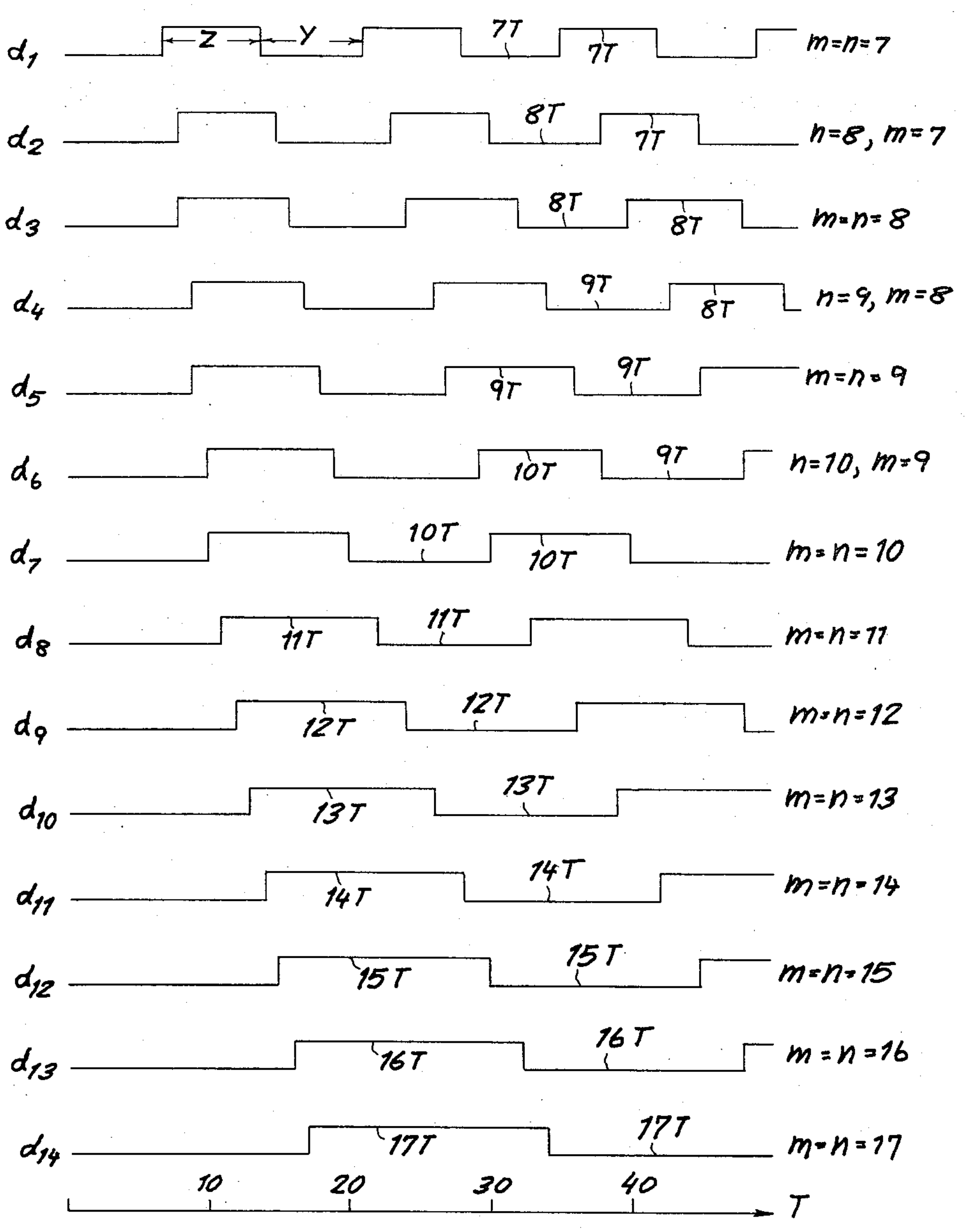
FIG. 2 is a set of graphs showing the basic structure of different interrogation codes selectively emitted by a pulse-generating network at one terminal station to test the several repeaters of FIG. 1.

FIG. 2 shows the several interrogation codes $d_1 - d_{14}$ assigned to the several repeaters $SR_1 - SR_{14}$ of FIG. 1. Each code is a recurrent pulse sequence, more fully illustrated in FIG. 2A, divided into two approximately equal parts, i.e. a first part $y$ of duration $n$T and a second part $z$ of duration $m$T. It will be noted that the overall period $(m+n)$T ranges from 14T for code $d_1$ to 34T for code $d_{14}$. At the higher repetition frequencies (codes $d_1 - d_7$), successive code periods differ by T with either $m$ or $n$ increasing by 1 from one code to the next; at the lower repetition frequencies (codes $d_8 - d_{14}$), the jump is by 2T with both $m$ and $n$ increasing by 1 from one code to the next and with $m = n$. Thus, $m = n = 7$ in code $d_1$; $m = 9$ and $n = 10$ in code $d_6$; and $m = n = 17$ in code $d_{14}$.

Figure 2A:
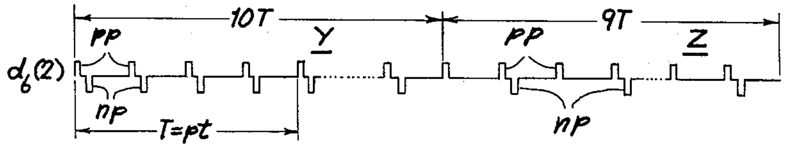
FIG. 2A is a graph showing in greater detail the structure of one of the interrogation codes of FIG. 2 in a specific mode of operation.

The part $z$ of each code may be modified in any of five different ways as more fully described hereinafter; graph $d_6(2)$ of FIG. 2A shows details of the pulse sequence constituting code $d_6$ in its second modification. Part $y$ of this code consists of 10 basic pulse patterns of duration $T = pt$ where $t$ is the length of a clock cycle and $p$ is an integer, here specifically 32; this basic pattern is composed of four positive pulses $pp$ alternating with four negative pulses $np$, each of these pulses having a width not greater than $t$ and being separated from its mate by a center-to-center spacing $2t$ (see graph 0/32 in FIG. 3). Each pair of closely spaced pulses $pp$, $np$ introduces a code segment of length $8t$, there being four such segments in the 8-pulse basic pattern.

Part $z$ of code $d_6(2)$ is composed of nine times the same basic pattern modified by the suppression of two of its four negative pulses $np$. The prevalence of positive over negative pulses in this part of the code gives rise to a recurrent d-c voltage in the output of repeater $SR_6$ (FIG. 1) which, if the repeater operates properly, alternates with the zero voltage of integrated part $y$ to produce a square wave whose fundamental frequency is passed by the filter $FL_6$ as the response signal of that repeater.

If the clock pulses ($cl$, FIG. 3) are generated at a cadence of $2^{11}$ pulses per millisecond, i.e. 2.048 MHz, the repetition frequency of code $d_6$ is 3,368 Hz since its period equals $19 \cdot 32 = 608$ clock cycles $t$. The repetition frequencies for all codes $d_1 - d_{14}$ range from 4,571 to 1,882 Hz.

It will be readily apparent that the amplitude of the d-c component of code portion $z$ rises with increasing deviation of the modified pulse sequence from the balanced pattern of part $y$. With an accurately regenerating filter, a doubling of the density of unmatched positive (or negative) pulses doubles the potential difference in the repeater output and therefore raises the power of the response signal by about 6 db. The increased d-c component due to a switch to a higher mode is tantamount to a lowering of the sgnal-to-noise ratio of the affected repeater, the absence of a corresponding rise in power indicating a decreased sensitivity.

Figure 3:
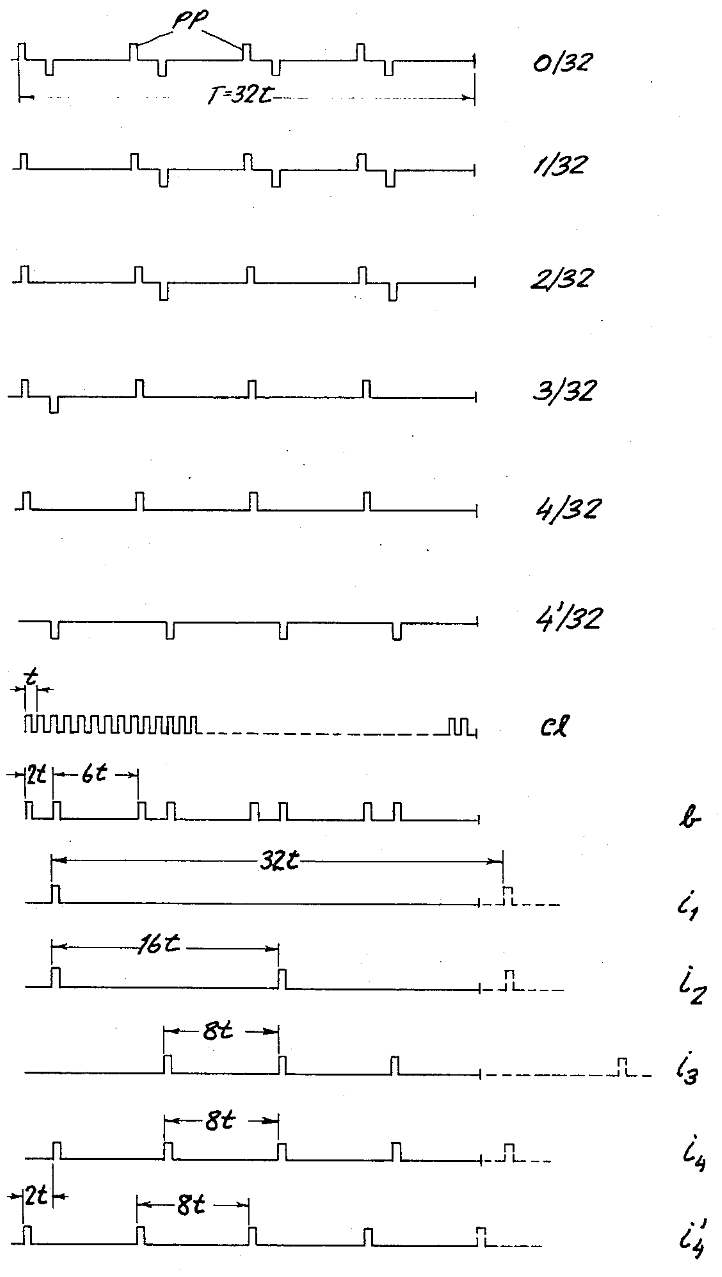
FIG. 3 is a set of graphs showing a variety of constituent pulse trains to be combined into the interrogation codes of FIG. 2.

The five modifications of code portion $z$, illustrated in FIG. 3, include in this specific instance the suppression of one, two, three or all four negative pulses $np$ of each code segment (graphs 1/32, 2/32, 3/32 and 4/32) and the suppression of the positive pulses $pp$ thereof in lieu of the negative ones (graph 4'/32); naturally, the polarities are chosen arbitrarily and could be interchanged. It is also possible to reverse the polarity of the negative pulses suppressed in FIG. 2A, i.e. to replace them by additional positive pulses following the first and third positive pulses of the basic pattern. The latter procedure, of course, results in larger increments of the d-c component upon shifting from one modification to the next.

FIG. 3 further illustrates a basic unipolar pulse pattern $b$ which is a precursor of the balanced pattern of graph 0/32, differing therefrom only by the fact that its paired pulses with separation $2t$ are both positive. By suppressing the second pulse of the first pair, either before or after polarity inversion, the modified pattern 1/32 is obtained; this can be done with the aid of a train of unbalancing pulses $i_1$ recurring at intervals $32t$. A similar train $i_2$, with a period of $16t$, converts the pattern $b$ into the modified pattern 2/32; in an analogous manner, pattern 3/32 can be produced with the aid of an irregular pulse train $i_3$ in which groups of three unbalancing pulses, separated by intervals of $8t$, follow one another with a spacing of $16t$. A regular pulse train $i_4$, aligned with the trailing pulses of the several pairs of pattern $b$, or a similar train $i'_4$, aligned with the leading pulses of these pairs, gives rise to the modified pattern 4/32 or 4'/32.

Figure 4:
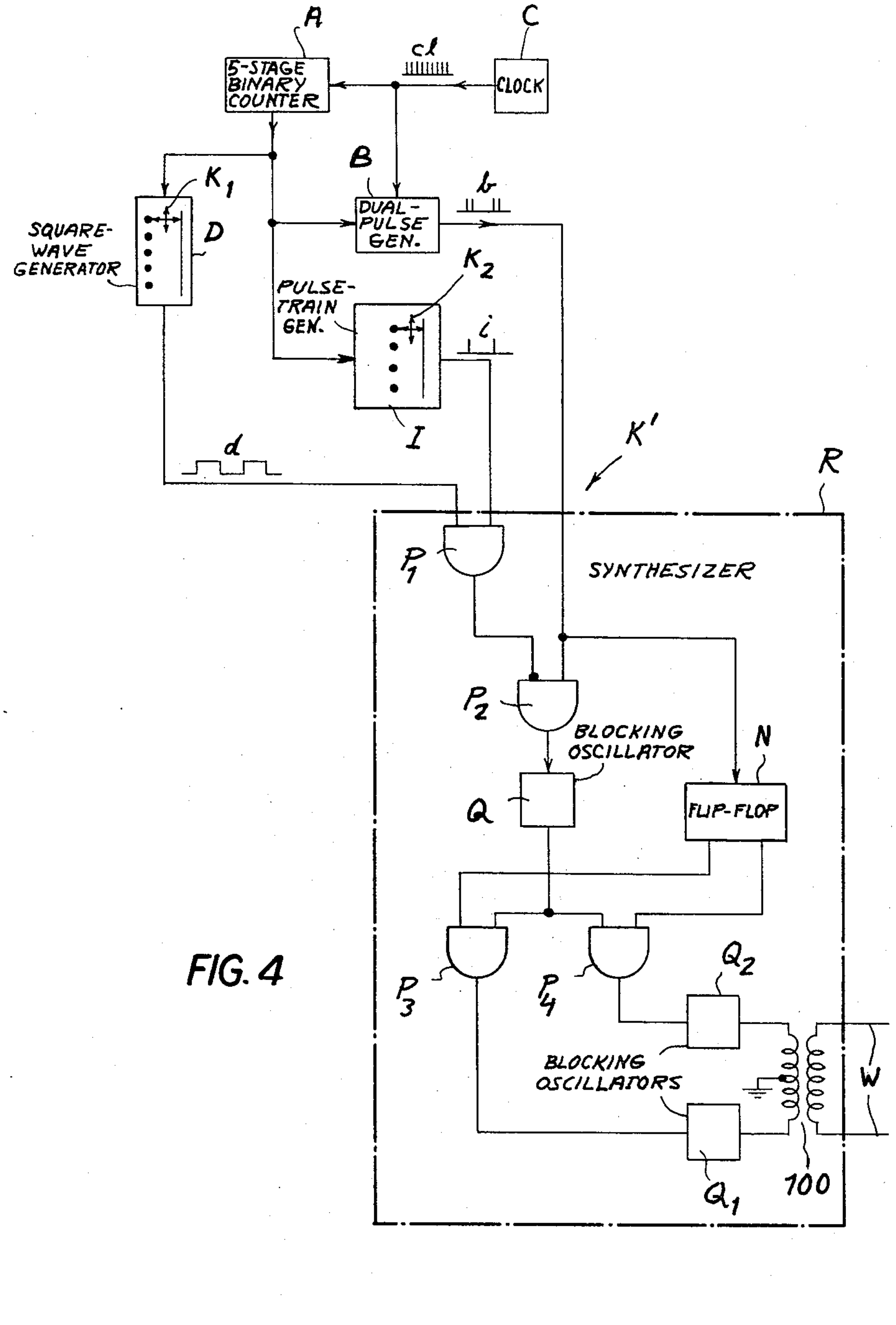
FIG. 4 is a block diagram of the pulse-generating network included in the system of FIG. 1.

In FIG. 4 I have shown the principal components of transmission section K' of the monitoring network K of FIG. 1. These components include a clock circuit C generating the pulses $cl$, a five-stage binary counter A stepped by these pulses, a dual-pulse generator B connected to be driven by the clock pulses $cl$ and by certain stage output of counter A to produce the pulse pattern $b$, a square-wave generator D also driven by the counter, a pulse-train generator I likewise controlled by certain stage outputs of counter A, and a synthesizer R connected to the outputs of components B, D and I. Generators D and I are adjustable with the aid of manual selectors $K_1$ and $K_2$ (cf, FIG. 1) to vary the period of a square wave *d* and the cadence of a pulse train *i* respectively produced thereby.

The synthesizer R of FIG. 4 comprises logical circuitry including four AND gates $P_1$, $P_2$, $P_3$, $P_4$; three pulse shapers Q, $Q_1$, $Q_2$ such as blocking oscillators, each emitting a short pulse of a width less than *t* upon being triggered; a flip-flop N with a switching input connected to the output of pulse generator B for reversal by each pulse of pattern *b;* and a coupling transformer 100 having its primary winding connected across the outputs of blocking oscillators $Q_1$, $Q_2$ and having its secondary winding connected across transmission line W.

AND gate $P_1$ has two inputs respectively receiving the square wave *d* and the pulse train *i* from generators D and I; this gate works into an inverting input of AND gate $P_2$ whose noninverting input is connected to the output of pulse generator B in parallel with the input of flip-flop N. Gate $P_2$, when energized, trips the blocking oscillator Q feeding respective inputs of AND gates $P_3$ and $P_4$ in parallel; the other inputs of these two AND gates are connected to respective outputs of flip-flop N. This flip-flop, accordingly, unblocks alternately one or the other transmission path for pulses *b* (as reshaped by blocking oscillator Q) to opposite ends of the transformer primary via pulse shapers $Q_1$ and $Q_2$, respectively.

As long as square wave *d* is at its low amplitude, AND gate $P_1$ is cut off and unblocks the AND gate $P_2$ in tandem therewith; thus, the recurrent basic code pulses *b* traverse the latter gate without modification of the pattern. Flip-flop N, by alternately directing these paired pulses into blocking oscillators $Q_1$ and $Q_2$, serves as a polarity inverter which changes the pattern *b* into the pattern 0/32 of FIG. 3. This mode of operation continues for a period *y* (FIGS. 2 and 2A) variable with the aid of manual address selector $K_1$. During the subsequent period *z*, AND gate $P_1$ passes the unbalancing pulses *i* to the inverting input of gate $P_2$ which therefore stops any code pulse from generator B coinciding with such unbalancing pulse. The result is a modified code sequence of the type shown in graph 1/32, 2/32, 3/32, 4/32 or 4'/32, depending upon the cadence of pulse train *i* as established by mode selector $K_2$.

Figure 4A:
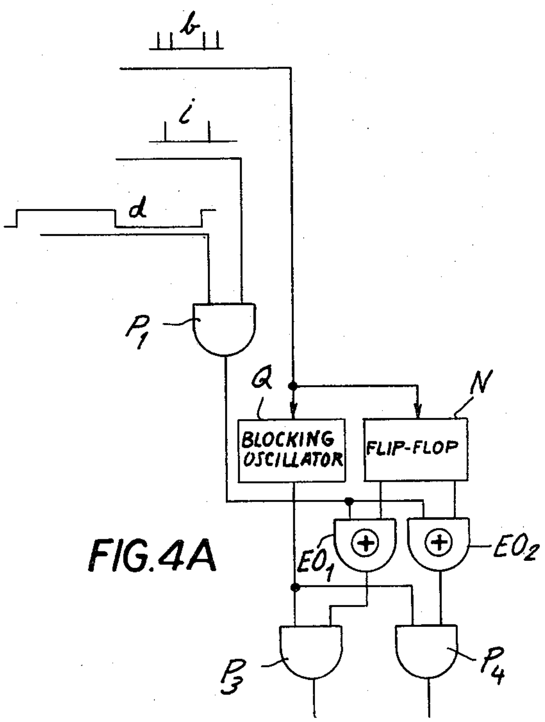
FIG. 4A is a block diagram showing a partial modification of the system of FIG. 4.

As illustrated in FIG. 4A, synthesizer R may be modified by omitting the AND gate $P_2$ in the input of blocking oscillator Q (which is therefore driven directly by pulses *b*) and inserting two switching gates $EO_1$ and $EO_2$, of the EXCLUSIVE-OR type, in the outputs of flip-flop N, these latter gates having other inputs connected in parallel to the output of gate $P_1$. As long as gate $P_1$ is blocked, gates $EO_1$ and $EO_2$ transmit the respective output pulses of flip-flop N unchanged to the gates $P_3$ and $P_4$. When, however, an unbalancing pulse *i* traverses the gate $P_1$ during the high-amplitude phase of square wave *d*, the EXCLUSIVE-OR gate not energized by the flip-flop passes that pulse to gate $P_3$ or $P_4$ so as to invert the polarity of the output pulse normally generated by the simultaneously arriving code pulse *b*.

Figure 5:
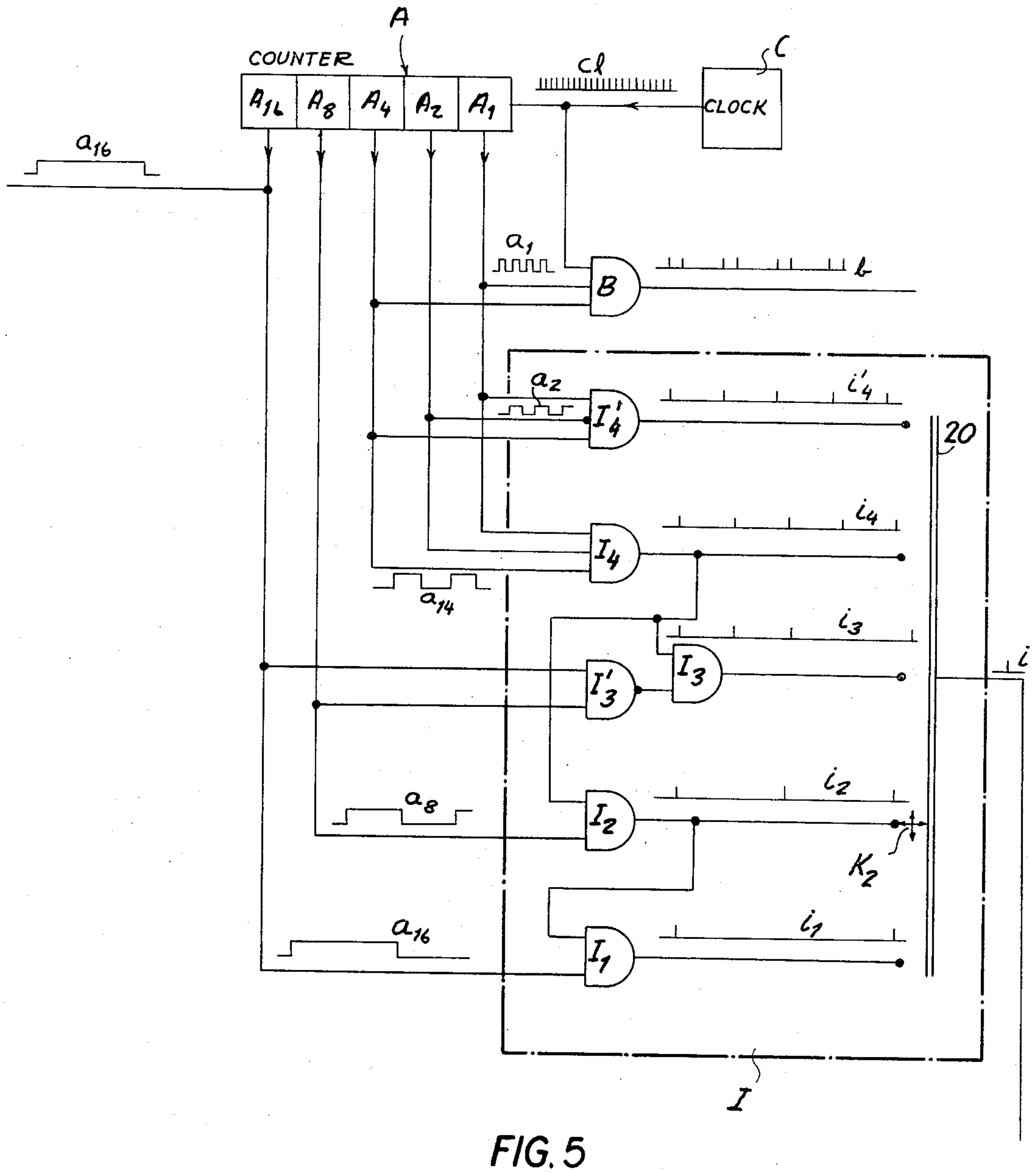
FIG. 5 is a more detailed circuit diagram of some of the components of the system of FIG. 4.

Details of pulse generators B and I are shown in FIG. 5 which also illustrates the five stages $A_1$, $A_2$, $A_4$, $A_8$ *and and* $A_{16}$ of counter A. Pulse generator B is simply an AND gate with a first input connected to clock circuit L for energization by pulses *cl*, a second input connected to the output of the first counter stage $A_1$ for intermittent energization by a square wave $a_1$ in the output thereof, and a third input connected to the output of counter stage $A_4$ for energization by its square wave $a_4$. This results in the appearance of a pulse *b* coinciding with the first and third clock pulses *cl* of any series of eight clock pulses.

Pulse generator I comprises several AND gates $I_1$, $I_2$, $I_3$, $I_4$ and $I'_4$, giving rise to trains $i_1$, $i_2$, $i_3$, $i_4$ and $i'_4$, respectively, as well as a NAND gate $I'_3$ working into one of the inputs of gate $I_3$ whose other input is energized from gate $I_4$ in parallel with an input of gate $I_2$. Gate $I_1$ receives a square wave $a_{16}$ from counter stage $A_{16}$ together with the output pulses $i_2$ of gate $I_2$, the latter having its second input connected to counter stage $A_8$ for receiving a square wave $a_8$ therefrom. Square waves $a_8$ and $a_{16}$ are also fed to NAND gate $I'_3$. AND gates $I_4$ and $I'_4$ are connected in parallel to the outputs of counter stages $A_1$, $A_2$ and $A_4$, having an inverting input for the square wave $a_2$ generated by stage $A_2$.

Mode selector $K_2$ is shown as comprising a slider positionable to connect the output of any one of the several AND gates $I_1 - I_4$, $I'_4$ to a bus bar 20 delivering the unbalancing pulses *i* to the gate $P_1$ of FIG. 4 or 4A.

Figure 6:
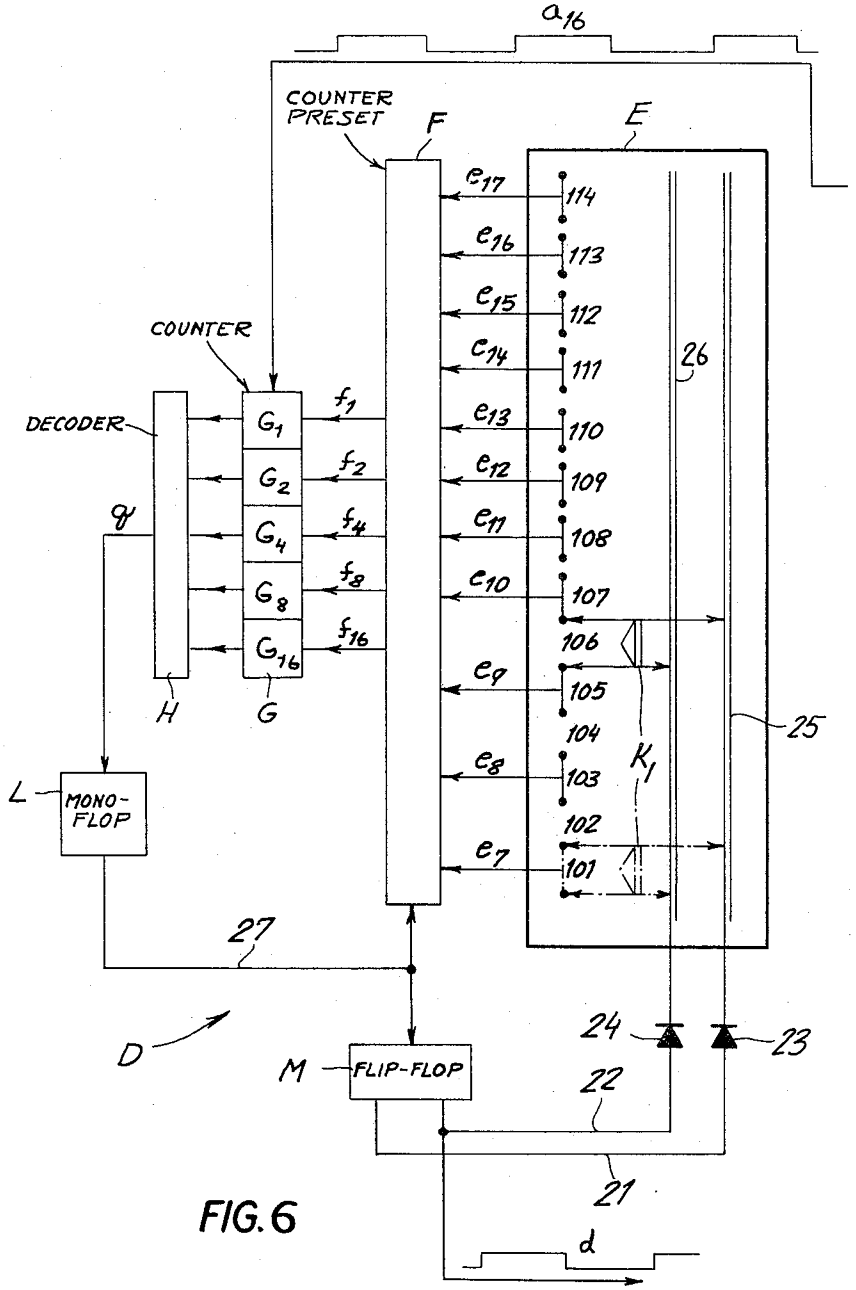
FIG. 6 is a more detailed circuit diagram of another component of the system of FIG. 4.

FIG. 6 shows details of square-wave generator D comprising another five-stage binary counter G which is stepped by the output $a_{16}$ of stage $A_{16}$ of counter A (FIG. 5). The five stages $G_1$, $G_2$, $G_4$, $G_8$, $G_{16}$ of counter G work into a decoder H which may be simply and AND gate with five inputs and which trips a monoflop L as soon as this counter is fully loaded, i.e. is advanced by $q = 31$ steps from its zero position (where *q* is equal to or greater than the maximum values of both *m* and *n*). Monoflop L, when tripped, applies a short pulse (as compared with a period of the square wave $a_{16}$ stepping this counter) via an output lead 27 to a switching input of a flip-flop M and, in parallel therewith, to a presetting unit F for counter G, this unit having five outputs $f_1$, $f_2$, $f_4$, $f_8$, $f_{16}$ terminating at correspondingly designated stages of counter G. Unit F is in turn controlled by a circuit E which includes the address selector $K_1$ (cf. FIG. 1) here shown as a slider adapted to occupy any one of fourteen different positions designated 101 – 114. In each of these positions, slider $K_1$ conductively connects two bus bars 25, 26 either to a single output lead or to a pair of adjoining output leads in a set of eleven such leads $e_7 - e_{17}$ which terminate at presetting unit F. Bus bars 25 and 26 are connected via respective diodes 23 and 24 to output leads 21 and 22 of flip-flop M, lead 22 also supplying the square wave *d* to gate $P_1$ of FIG. 4 or 4A.

Figure 7:
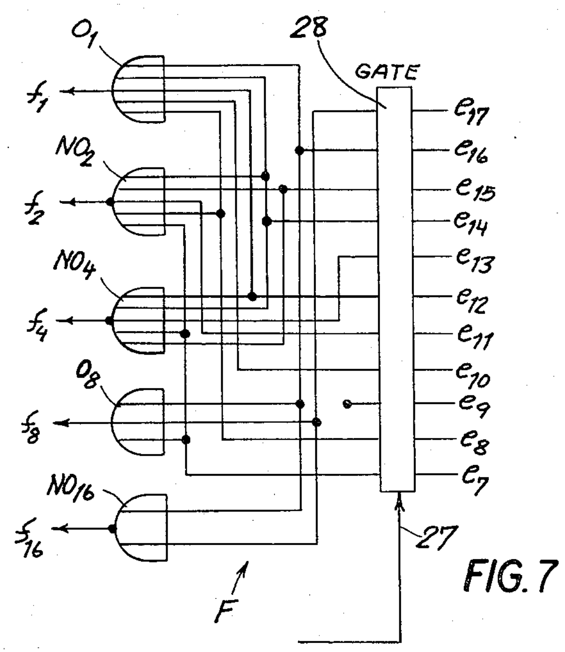
FIG. 7 shows details of one of the units of FIG. 6.

As shown in FIG. 7, unit F comprises a logic matrix with two OR gates $O_1$, $O_8$, respectively feeding the leads $f_1$ and $f_8$, and three NOR gates $NO_2$, $NO_4$ and $NO_{16}$, respectively feeding the leads $f_2$, $f_4$ and $f_{16}$. The connections from input leads $e_7$, $e_8$ and $e_{10} - e_{17}$ to these OR and NOR gates (lead $e_9$ being left unconnected) include a normally blocked gate 28, briefly unblocked by a pulse from monoflop L on lead 27, and are so arranged that the counter G is preloaded with a binary work representing the complement *q–m* or *q–n* of the value of *m* or *n* selected by the positioning of the slider $K_1$. In slider position 101, both bus bars 25 and 26 are connected to lead $e_7$ to establish the numerical value 7 for both *m* and *n* (see graph $d_1$ of FIG. 2) as indicated by the subscript of that lead; this causes energization of OR gate $O_8$ and NOR gates $NO_2$, $NO_4$, with resulting loading of counter stages $G_8$ and $G_{16}$ for a count of 24 = 31−7. In position 102, slider $K_1$ energizes lead $e_7$ from bus bar 26 whenever flip-flop output 22 carries voltage, thus after every other tripping of monoflop L, thereby again preloading the counter G to establish a value of $m = 7$ in conformity with graph $d_2$ of FIG. 2; upon the switching of flip-flop M, the energization of bus bar 25 through flip-flop output 21 applies voltage to lead $e_8$ to energize OR gate $O_1$ whereby counter stages $G_1$, $G_2$, $G_4$ and $G_{16}$ are preloaded for a count of 23 = 31−8. It will thus be seen that the several code sequences of FIG. 2 can be established by progressively moving the slider $K_1$ from position 101 through position 114.

Counter G could also be stepped by the output pulses $i$ of AND gates $I_1$ (FIG. 5) in lieu of square wave $a_{16}$ from counter stage $A_{16}$.

I claim:

1. A network for transmitting interrogation codes over a pulse-code-modulation channel to test the performance of a repeater inserted in said channel, comprising:

timing means emitting a continuous train of clock pulses recurring at intervals $t$:

pulse-generating means controlled by said timing means for iteratively producing a balanced basic pulse pattern with an equal number of positive and negative pulses in the rhythm of said clock pulses extending over a cycle $T = pt$, $P$ being an integer;

a source of unbalancing pulses, timed to coincide with a selected portion of said basic pulse pattern, controlled by said timing means for alternate operation and nonoperation during $m$ and $n$ consecutive cycles T, respectively, thereby making unequal the number of positive and negative pulses in said selected portion;

synthesizing means connected to receive said basic pulse pattern from said pulse-generating means and said unbalancing pulses from said source for combining same into a recurrent code sequence consisting of $n$ cycles of a balanced pulse pattern of duration T followed by $m$ cycles of the same pulse pattern modified by said unbalancing pulses; and selector means coupled to said source for altering the recurrence rate of said unbalancing pulses, thereby altering the degree of unbalance of the pulse pattern modified by said unbalancing pulses.

2. A network as defined in claim 1 wherein said timing means includes a generator of said clock pulses and a multistage binary counter connected to said generator for stepping by said clock pulses, said pulse-generating means and said source comprising logical circuitry connected to said generator and to several stages of said counter.

3. A network as defined in claim 2 wherein said logical circuitry includes a first coincidence gate forming part of said pulse-generating means and producing a succession of paired unipolar first pulses constituting said basic pattern, said circuitry further including a plurality of second coincidence gates forming part of said source and producing trains of differently spaced unipolar second pulses, said selector means being operable to derive said unbalancing pulses from the pulse trains passing any one of said second coincidence gates, said synthesizing means including inverter means for alternate ones of said paired pulses.

4. A network as defined in claim 3 wherein said synthesizer forms a pair of parallel paths for said first pulses, said inverter means including a pair of gates in said paths, a coupling stage connected across said paths beyond said gates and a flip-flop with a switching input connected to said pulse-generating means for alternately unblocking said gates whereby said first pulses alternately tranverse said coupling stage in opposite directions, said synthesizer further comprising additional gate means in tandem with said pair of gates connected to said selector means for modifying the travel of said first pulses along said paths in response to said unbalancing pulses.

5. A network as defined in claim 4 wherein said additional gate means comprises an And gate with a noninverting input for said first pulses and an inverting input for said unbalancing pulses, thereby stopping said first pulses in the presence of said unbalancing pulses.

6. A network as defined in claim 4 wherein said additional gate means comprises a pair of switching gates inserted between said flip-flop and said pair of gates for reversing the effect of said flip-flop upon the travel of said first pulses in the presence of said unbalancing pulses.

7. A network as defined in claim 4 wherein said timing means includes a square-wave generator under the control of said counter connected to said additional gate means for inhibiting said unbalancing pulses during said $n$ cycles of a code sequence.

8. A network as defined in claim 7 wherein said square-wave generator comprises a second binary counter connected to be stepped by a stage output of the first-mentioned counter and provided with presetting means for emitting a switching signal upon a count of a selected number of cycles, and bistable means responsive to said signal for alternately switching said presetting means to establish said count alternately at $m$ and $n$ cycles.

9. A network as defined in claim 8 wherein said second counter has a capacity q at least equal to the maximum values of $m$ and $n$, said presetting means including a logic matrix connected to said second counter for preloading same with a respective count of $q–m$ and $q–n$ in response to alternate switching signals.

10. A network as defined in claim 9 wherein said logic matrix is provided with enabling means selectively operable to establish various values for $m$ and $n$.

11. A method of testing the performance of a repeater in a pulse-code-modulation transmission channel, comprising the steps of:

generating an interrogation code in the form of a sequence of bipolar pulses recurring with a predetermined repetition frequency which corresponds to a pass frequency of a filter in the output of the repeater to be tested, said sequence being divided into a balanced first part with an equal number of positive and negative pulses and an unbalanced second part with at least one pulse of one polarity unmatched by a pulse of the other polarity whereby a response signal at said repetition frequency is generated in the output of the properly functioning repeater;

modifying the degree of unbalance of said second part by changing the number of unmatched pulses thereof; and comparing the amplitude of said response signal generated with different degrees of unbalance to determine the presence of correlation between said amplitudes and said degree of unbalance as a measure of the efficiency of the repeater.

12. A method as defined in claim 11, comprising the further step of varying said repetition frequency to test different repeaters in said channel.

13. A method as defined in claim 12 wherein the duration of said first part is a multiple $n$T and the duration of said second part is a multiple $m$T of a basic period T, said repetition frequency being varied by changing the value of $(m+n)$ while holding the difference between $m$ and $n$ equal to at most one period T.

14. A method as defined in claim 11 wherein the step of modifying said degree of unbalance includes alternately suppressing pulses of both polarities in said second part.

* * * * *